United States Patent
DeBickes et al.

(10) Patent No.: US 10,318,758 B2
(45) Date of Patent: Jun. 11, 2019

(54) SELECTABLE PRIVACY MODES

(71) Applicant: BlackBerry Limited, Waterloo (CA)

(72) Inventors: Nicole Melissa DeBickes, Boca Raton, FL (US); Jason Lee Carter, Davie, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 188 days.

(21) Appl. No.: 15/378,804

(22) Filed: Dec. 14, 2016

(65) Prior Publication Data

US 2018/0165473 A1    Jun. 14, 2018

(51) Int. Cl.
*G06F 21/62* (2013.01)
*H04L 29/06* (2006.01)
(Continued)

(52) U.S. Cl.
CPC ...... *G06F 21/6245* (2013.01); *H04L 63/0272* (2013.01); *H04L 63/04* (2013.01); *H04L 63/105* (2013.01); *G06F 21/6254* (2013.01); *G06F 21/83* (2013.01); *G06F 2221/031* (2013.01); *G06F 2221/2111* (2013.01); *H04W 12/02* (2013.01)

(58) Field of Classification Search
CPC ............ G06F 21/6245; G06F 21/6254; G06F 21/629; G06F 21/604; G06F 21/83; G06F 2221/031; G06F 2221/2111; H04W 12/02; H04L 63/0272; H04L 63/04
See application file for complete search history.

(56) References Cited

U.S. PATENT DOCUMENTS 7,023,828 B2 *  4/2006  Korus ............... H04L 12/18
                                                370/338
7,185,204 B2 *  2/2007  Narayanaswami ..... H04L 63/08
                                                713/155
(Continued)

FOREIGN PATENT DOCUMENTS

EP        3336741        6/2018
WO    2016109816 A1    7/2016

OTHER PUBLICATIONS

Gordon, Whitson, "Llama Automates Nearly Any Setting on Your Android Phone", May 9, 2011, https://lifehacker.com/5800147/Llama-automates-nearly-any-setting-on-your-android-phone/.*

(Continued)

*Primary Examiner* — Kambiz Zand
*Assistant Examiner* — Tongoc Tran
(74) *Attorney, Agent, or Firm* — Jeffrey N. Giunta; Fleit Gibbons Gutman Bongini & Bianco P.L.

(57) ABSTRACT

A system and method for selectable privacy modes are disclosed. A plurality of privacy mode definitions are stored with each privacy mode definition including a respective control state definition for each function in a plurality of functions of an electronic device. The plurality of functions includes at least two of communications functions, sensor functions, application functions, or combinations of these. An input indicating a selected privacy mode definition from within the plurality of privacy mode definitions is received. A respective control state of each function in the plurality of functions is set based on each respective control state definition in the selected privacy mode definition.

19 Claims, 6 Drawing Sheets

(51) Int. Cl.
*G06F 21/83* (2013.01)
*H04W 12/02* (2009.01)

(56) References Cited

U.S. PATENT DOCUMENTS

| | | | |
|---|---|---|---|
| 7,933,611 B2 | 4/2011 | Bocking et al. | |
| 8,407,764 B2* | 3/2013 | Kang | H04L 63/08 726/3 |
| 8,494,591 B2 | 7/2013 | Bocking et al. | |
| 8,503,369 B2* | 8/2013 | Mizukoshi | H04W 88/06 370/328 |
| 8,514,777 B1* | 8/2013 | Zhao | H04L 63/0414 370/328 |
| 8,824,678 B2* | 9/2014 | Ochikubo | H04W 12/02 380/270 |
| 9,154,913 B2 | 10/2015 | Bocking et al. | |
| 9,699,217 B2* | 7/2017 | Plagemann | G06F 21/629 |
| 2008/0305766 A1* | 12/2008 | Falk | H04L 63/20 455/410 |
| 2010/0191837 A1* | 7/2010 | Linden | H04L 41/0806 709/220 |
| 2012/0213211 A1* | 8/2012 | Remaker | H04L 63/0421 370/338 |
| 2014/0187200 A1* | 7/2014 | Reitter | H04W 12/08 455/410 |
| 2015/0095501 A1* | 4/2015 | Candelore | H04L 61/2092 709/227 |
| 2015/0118996 A1* | 4/2015 | Shaw | H04W 4/70 455/411 |
| 2015/0143459 A1* | 5/2015 | Molnar | G06F 21/629 726/2 |
| 2015/0248566 A1 | 9/2015 | Scott-Nash et al. | |
| 2015/0281167 A1* | 10/2015 | Seddon | H04W 4/021 370/331 |
| 2017/0374034 A1* | 12/2017 | Zuniga | H04L 63/102 |
| 2018/0165472 A1* | 6/2018 | Adams | G06F 21/83 |

OTHER PUBLICATIONS

Zukerman, Erez, "Use Llama to Automate Your Android Phone With Location Profiles & More", Jun. 3, 2011, https://www.makeuseof.com/tag/Llama-automate-android-phone-location-profiles/.*

Tasker Userguide (http://tasker.wikidot.com/userguide-en:help-ah-index, Sep. 17, 2014. pp. 1-36.*

Extended European Search Report dated Jan. 19, 2018, received for European Patent Application No. 17204210.3. 2018.

Gordon, W., Llama Automates Nearly Any Setting on Your Android Phone, May 9, 2011, retrieved from the internet: URL:http://wayback.archive.org/web/20120413082537/http://lifehacker.com/5800147/ retrieved on Jan. 29, 2014. 2014.

Hollywoodfrodo: "Llama Android App Review—Automation, Location, & Best NFC App!", Aug. 31, 2013, XP054978000, retrieved from the Internet: URL:https://www.youtube.com/watch?v-XsYp4RLjvQg, retrieved on Jan. 10, 2018. 2018.

Communication pursuant to Article 94(3) EPC issued for corresponding European Application No. 17204210.3 dated Jan. 14, 2019.

* cited by examiner

| | PRIVACY MODE LEVEL | | | | | |
|---|---|---|---|---|---|---|
| 302 ↓ | 1 | 2 | 3 | HOME | OFFICE | NIGHT |
| 310 → CAMERA VIDEO | N | N | Y | | | |
| 312 → CAMERA PHOTO | N | Y | Y | | | |
| 314 → AUDIO RECORDING | N | N | Y | | | |
| 316 → AUDIO TRANSMIT | N | Y | Y | | | |
| 318 → LOCATION REPORTING | N | Y | Y | | | |
| 320 → LOCATION RANDOM | | Y | Y | | | |
| 322 → LOCATION FALSE | | | Y | | | |
| 324 → MAC TRACKING | N | N | Y | N | Y | N |
| 326 → VPN REQUIRED | N | N | Y | N | Y | N |
| 328 → NONPRIVATE WEB BROWSING ALLOWED | N | N | Y | Y | N | N |
| | 330 ↑ | 332 ↑ | 334 ↑ | 336 ↑ | 338 ↑ | 340 ↑ |
| | USER SELECTED | | | LOCATION SELECTED | | TIME SELECTED |

FIG. 3

SELECTABLE PRIVACY MODES

FIELD OF THE DISCLOSURE

The present disclosure generally relates to electronic device operations, and more particularly to configuring device operations based on user privacy considerations.

BACKGROUND

Electronic devices, such as smartphones, computers, and the like, include functions that are related to the privacy of the user or others in the vicinity of the device. For example, some electronic devices are able to perform one more functions associated with, e.g., recording or sending video, photos, audio, the device's location, identifying data to other nearby devices, other functions, or combination of these. In some examples, users desire to disable some or all of such functions in order to reduce the likelihood that the privacy of the user or others near the device is invaded.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 3 illustrates a privacy mode definitions table, according to an example;

DETAILED DESCRIPTION

Figure 1:
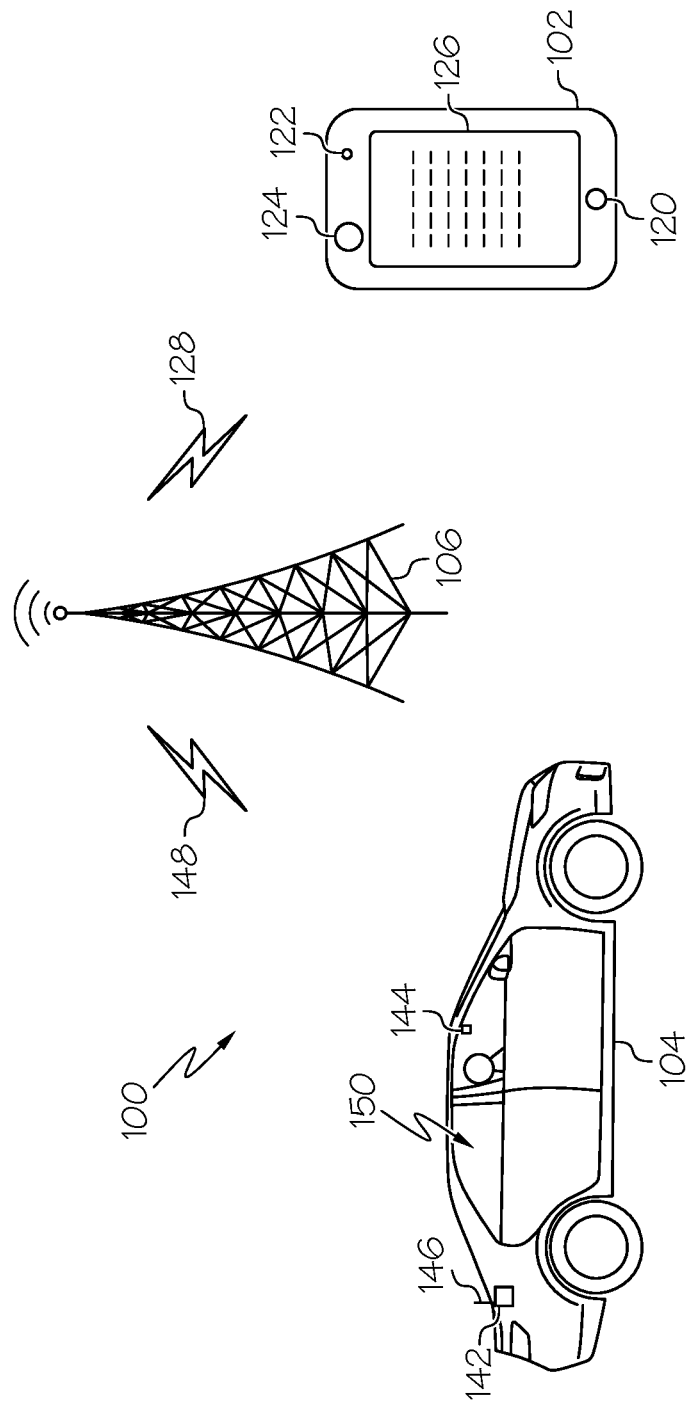
FIG. 1 illustrates an electronic device operational environment, according to an example.

Detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described examples of systems and methods allow a user to easily and quickly activate or deactivate a selected privacy mode for an electronic device. In various examples, an electronic device is able to have one or more selectable privacy mode definitions that each defines a control state for two or more privacy related functions performed by the electronic device. Control states for privacy related functions defined within each privacy mode definition include, for example, specifications as to whether a particular privacy related function is enabled, disabled, otherwise controlled, or combinations of these. In the following discussion, privacy related functions include functions that are related to an ability to invade the privacy of a user of the device or of persons near the device such as by monitoring activities or other aspects of the user or persons near the device. Monitoring of activities or other aspects of the user or persons near the device in some examples may include monitoring in ways that are unexpected, inadvertently allowed, unauthorized, or combinations of these, by the user of the device. Privacy functions in some examples include: functions associated with recording or sending video, photos, audio, or combinations of these; functions for recording or transmitting the device's location; functions for sending data to nearby devices; functions associated with monitoring the use or operation of various aspects of the device; other functions; or any combination of these.

Conventional devices in some examples allow a user to individually disable some of a device's functions, including privacy related functions. Generally, a device may have a number of privacy related functions and enabling, disabling, or both, of all of these functions can be a tedious and error-prone process. For example, a user may have to navigate to one user interface screen to enable or disable a camera, and then navigate to another user interface screen to enable or disable a microphone. In some instances, privacy related functions may be enabled or disabled in the settings of an individual application, such as a web browser application. For example, some web browsers include a "privacy mode" that restricts how much information is stored regarding the browsing history and other user information concern the user's web browsing. In some examples, privacy mode in a browser is not able to be specified to be a default upon startup. In general, a user of a web browser has to perform a special task each time a web browser app is started to enable privacy mode.

The below described systems and methods allow a particular privacy mode to be selected and activated by various techniques. In one example, an electronic device has a physical switch that is able to activate a particular privacy mode or deactivate privacy modes. In another example, graphical user interfaces present graphical user interface elements to allow a particular privacy mode to be activated, allow a user to select a selected privacy mode from a several available privacy modes, deactivate privacy modes, or combinations of these.

FIG. 1 illustrates an electronic device operational environment 100, according to an example. The electronic device operational environment 100 depicts several electronic devices that are able to include selectable privacy modes and an example environment in which those electronic devices operate. In order to simplify the description of relevant aspects of the below described systems and methods, a simplified depiction of two mobile electronic devices and a base station are depicted in the electronic device operational environment 100. It is to be understood that further examples are able to support operational environments with many electronic devices that are able to be mobile, portable, fixed, or in other configurations that operate with one or more wired communications systems, wireless communications systems, other communications systems, or combinations of these.

The electronic device operational environment 100 depicts a communications transceiver 106. The communications transceiver 106 in an example supports communications with any number of remote data devices. The electronic device operational environment 100 depicts two electronic devices, a portable device that is a cellular phone 102, and a mobile device that is a vehicle electronics device 142 within a vehicle 104. This example depicts two electronic devices to more clearly describe the relevant aspects of the below described systems and methods.

In general, any number of electronic devices that supports selectable privacy modes is able to exist in an electronic device operational environment 100. In various examples, any type of electronic device is able to support selectable privacy modes and be used in an operational environment. For example, electronic devices that support selectable privacy modes are able to include one or more of portable electronic devices, which include devices that are easily carried by a person or other carrier; or mobile devices, which include devices mounted in movable systems such as vehicles of any type. In various examples, electronic devices that support selectable privacy modes are able to be located in vehicles that include, but are not limited to, motor vehicles (e.g., cars), but also aircraft, spacecraft, watercraft, railed vehicles, or other vehicles. Electronic devices that support selectable privacy modes are also able to include fixed devices, which include devices that are not designed to be easily or often relocated such as desktop electronic equipment; other types of electronic equipment, or combinations of these.

In various examples, communications transceiver 106 is able to be one or more of a cellular communications tower, a local area wireless network access point, any other communications transceiver, or any combination of these. Although a single communications transceiver 106 is shown in the illustrated electronic device operational environment 100, various electronic devices are able to communicate with wireless communications systems that include one or more communications transceivers such as with cellular communications systems. Electronic devices are also able to communicate via any type of communications system interface, such as communications systems that support one or more of wired or wireless communications interfaces with the electronic device. In various examples, electronic devices are able to communicate via one or more of various types of communications systems or networks. For example, some electronic devices are able to communicate via direct communications links to other electronic devices (e.g., NFC, Bluetooth®, etc.), via various communications networks, or combinations of these.

In an example, some electronic devices are able to communicate data, voice, other information, or combinations of these by any suitable technique. The illustrated electronic devices support wireless communications, but the principles described herein are applicable to devices that communicate via wireless communications, wired communications, other communications techniques, or combinations of these. In some examples, devices that support selectable privacy modes do not have any communications functionalities.

The cellular phone 102 communicates via a first wireless link 128 with the communications transceiver 106. The cellular phone 102 is shown to have a microphone 120, a speaker 124, a camera 122, and a display 126. In an example, the cellular phone 102 is able to have one or more selectable privacy modes that cause functions associated with, for example, the camera 122, microphone 120, internal functions of the cellular phone 102, other functions, or combinations of these, to be enabled, disabled, restricted, otherwise controlled, or combinations of these.

The vehicle electronics device 142 is located within a vehicle 104. The vehicle electronics device 142 includes a wireless communications transceiver that communicates via a second wireless link 148 with the communications transceiver 106 via an antenna 146. The passenger compartment 150 of the vehicle 140 has a vehicle microphone 144 that picks up sounds, such as voices, within the passenger compartment 150. In an example, one or more privacy modes are able to control functions associated with the microphone 144 by enabling, disabling, restricting, otherwise controlling, or combinations of these, any functions using the microphone 144. In an example, the vehicle electronics device 142 also receives vehicle location information from a location system (not shown) in the vehicle. One or more privacy modes of the vehicle electronics device 142 is able to control functions using vehicle locations reported by that location system, such as enabling, disabling, restricting, altering, otherwise controlling, or combinations of these, the location reported by the vehicle electronics device 142.

Figure 2:
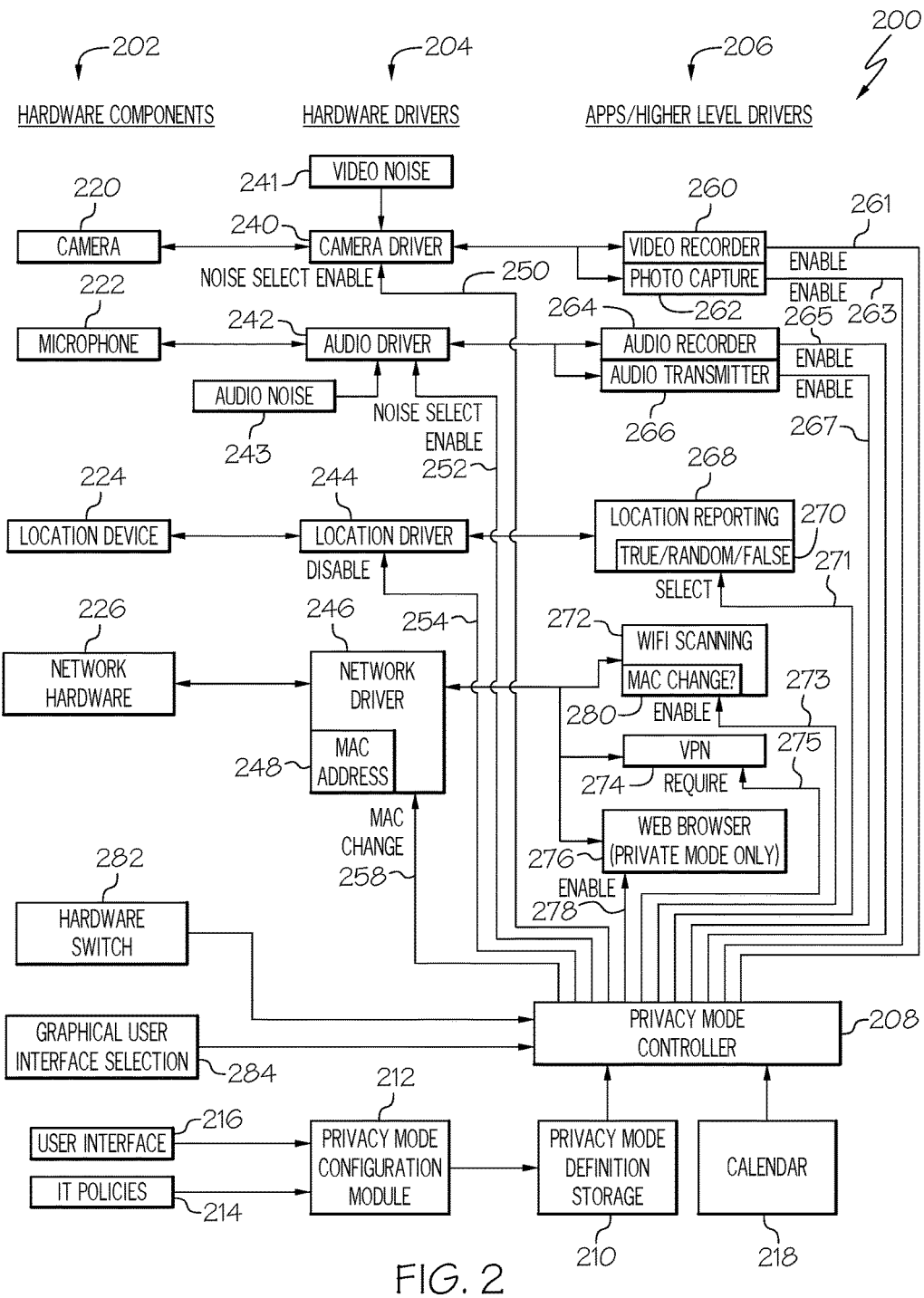
FIG. 2 illustrates an electronic device block diagram, according to an example.

FIG. 2 illustrates an electronic device block diagram 200, according to an example. The electronic device block diagram is an example of a device with a design that supports effective implementation of selectable privacy modes. The electronic device block diagram 200 depicts a subset of components within an electronic device that are related to implementing selectable privacy modes for the device. For example, the electronic device block diagram 200 depicts components that include examples of hardware components 202, hardware drivers 204, and apps/higher level drivers 206. These components are examples of components in an electronic device that are associated with privacy related functions that are controlled in various ways to implement various privacy modes. In further examples, an electronic device is able to have other components with functions that are controlled in one or more ways to implement one or more privacy modes. A complete electronic hardware device may generally have other components in addition to those depicted in the electronic device block diagram 200. The illustrated components were selected to more clearly and concisely describe the important aspects of the below described systems and methods to implement selectable privacy modes.

In the following discussion, the term component refers to any element of an electronic device that is controlled to implement any aspect of a privacy mode. The term "function" refers to any aspect of an electronic device that is controlled in order to implement at least part of a privacy mode. Functions are generally associated with a component of the device. For example, a camera or a camera driver is an example of a component and a function related to those components includes operations of taking a photo with that camera. The function of taking a photo may be controlled, such as by being disabled, to implement a privacy mode. In such an example, taking a photo is a controlled privacy related function, and the camera is a controlled component.

The electronic device block diagram 200 includes a privacy mode controller 208 that in some examples performs processing to implement selectable privacy modes. In various examples, the below described functions of a privacy mode controller 208 are able to be performed by a processor, microprocessor, software, or any combinations of these. As discussed below, the privacy mode controller 208 is able to control various hardware components 202, hardware drivers 204, and app or higher level drivers 206. The privacy mode controller 208 controls those components in various ways in order to implement a selected privacy mode.

The privacy mode controller 208 in an example has access to a privacy mode definition storage 210 that stores one or more privacy mode definitions. Each privacy mode definition within the privacy mode definition storage 210 specifies, for example, states or other control definitions for various hardware components 202, hardware driver 204, app or higher level drivers 206, other components, or for combinations of these, that are to be set when activating the privacy mode associated with that privacy mode definition. The privacy mode definition storage 210 is maintained by a processor, such as a processor implementing the privacy mode controller 208. Maintaining the privacy mode definition storage 210 is an example of storing a plurality of privacy mode definitions where each privacy mode definition includes a respective control state definition for each function in a plurality of functions of an electronic device. In an example, each privacy mode definition includes control states for at least two of: communications functions, sensor functions, application functions, or combinations of these. In an example, the privacy mode definition storage 210 includes a number of definitions that each specifies a different set of state or other control information for one or more of these components.

The privacy mode controller 208 in an example receives one or more inputs that specify a selected privacy mode from within the privacy mode definition storage 210. When a particular privacy mode is indicated as a selected privacy mode, the privacy mode controller 208 in this example activates the selected privacy mode by setting a control state for each of the hardware components 202, hardware driver 204, app or higher level drivers 206, or combinations of these, in accordance with the definitions in the selected privacy mode. In the absence of a selected privacy mode, the privacy modes are referred to as "deactivated" or "turned off" and no control of device components related to implementing privacy modes is performed. In an example, when privacy modes are deactivated, control and configuration of the hardware components 202, hardware driver 204, app or higher level drivers 206, or for combinations of these is performed according to other configuration information, enterprise policies, other criteria, or combinations of these.

In one example, the privacy mode definition storage 210 stores only one privacy mode definition. In such an example, the privacy mode controller can be said to be operating in a simplified mode where that the privacy mode of the electronic device is either turned "on" or "off." In this example, selecting the one privacy mode definition turns privacy mode "on" and not selecting that privacy mode definition, whereby no privacy mode definition is selected, turns the privacy mode "off."

A particular privacy mode definition from within a number of privacy mode definitions stored in the privacy mode definition storage 210 is able to be selected by any suitable technique. In one example, the privacy mode controller 208 receives an input from a hardware switch 282 that indicates a selected privacy mode definition from within the privacy mode definition storage 210. In an example, the hardware switch 282 is a single open/close switch that is mounted on the device. In one such example, one privacy mode definition is able to be stored or otherwise indicated as the privacy mode definition to activate when a hardware switch 282 is open or closed. In further examples, the hardware switch 282 has multiple positions to allow selection of one output from a number of outputs so that a selected privacy mode from within that number of privacy modes stored within the privacy mode definition storage 210 is able to be indicated by the output of the hardware switch 282. Operation of the hardware switch 282 in an example causes the privacy mode controller 208 to receive an input indicating a selected privacy mode definition from within a plurality of privacy mode definitions, where receiving that input includes receiving input from a hardware switch mounted on the device.

A graphical user interface selection 284 in some examples allows a user to select a privacy mode definition to be activated as the selected privacy mode. In an example, the graphical user interface 284 presents a simple graphical element, such as one graphical button, to indicate that a defined privacy mode definition to be activated as the selected privacy mode. In further examples, the graphical user interface selection 284 presents a number of graphical elements, such as a number of graphical buttons, that each corresponds to a different privacy mode definition. A user in an example is able to select one of a number of privacy mode definitions as a selected privacy mode by pressing one of the presented graphical buttons. Examples of various graphical user interface selection 284 designs are described below. Use of a graphical user interface selection 284 in an example causes the privacy mode controller 208 to receive an input indicating a selected privacy mode definition from within a plurality of privacy mode definitions, where receiving that input includes receiving a selection of a single graphical user interface icon.

In addition to receiving inputs by various techniques, the privacy mode controller 208 is also able to receive inputs in some examples indicating a selected privacy mode definition based on various events. For example, some privacy mode definitions are able to be associated with extrinsic state data concerning the electronic device. For example, some privacy mode definitions are able to have an associated time of day or geographic location. In an example, the privacy mode for the privacy mode definition associated with that time or geographic location is activated when that time of day occurs or the electronic device enters the geographic area.

A calendar 218 is also able to provide data to the privacy mode controller 208 to indicate that a privacy mode should be activated. In an example, an electronic device is able to be configured to activate a particular privacy mode during meetings or other scheduled events that are scheduled for a user associated with the electronic device. During such meetings or events, as are indicted by data stored in the calendar 218, the privacy mode controller 208 activates a privacy mode. In various examples, a privacy mode is activated for a privacy mode definition that is associated with meetings or events in general, that is associated with the particular meeting or event that is now occurring based on data within the calendar 218, for any other privacy mode definition, or combinations of these. In an example, once the scheduled time of the meeting or event is over, the privacy mode is deactivated or, in some cases, set back to a privacy mode that was previously enabled prior to the start of the calendar event.

A privacy mode configuration module 212 in an example allows one or more privacy mode definitions to be defined for storage into the privacy mode definition storage 210. The privacy mode configuration module 212 in an example operates with a user interface 216 to allow a user to define various privacy mode definitions that are stored in the privacy mode definition storage 210. The privacy mode configuration module 212 in an example may also operate with one or more Information Technologies (IT) policy definitions 214. In an example, the IT policy definitions 214 define one or more elements for a privacy mode definition. In an example, IT policies are defined by an enterprise Information Technology department and define minimum controls that have to be used in at least some privacy modes.

The hardware components 202 in this example include a camera 220, microphone 222, location device 224, and network hardware 226. In the illustrated example, the hardware components 202 provide output signals to respective hardware drivers 204. The camera 220 in an example captures visual images and provides the captured images to a camera driver 240 to support capturing either photos or videos. The microphone 222 captures audio signals and provides the audio signals to an audio driver 242 to capture sounds in the vicinity of the microphone 222. The location device 224 determines the location of the electronic device and provides that location to a location driver 244. In an example, the location device 224 is a GPS receiver or other radio-navigation device that produces a present geographic location for the electronic device. In the illustrated example, bi-directional communications are shown between the hardware components 202 and hardware drivers 204, and also between the hardware drivers 204 and Apps/Higher Level Drivers 206, in further examples, one or more of these interfaces may include one way communications between one or more pairs of these elements.

The network hardware 226 in various examples provides information to, and also receives information from, a network driver 246. The network hardware 226 includes communications facilities to support communications over, for example, wired network interfaces, wireless network interfaces, other communications interfaces, or combinations of these. In an example, the network hardware 226 is able to include a Wi-Fi® interface to support wireless data transmissions via the Wi-Fi® data standard. In general, the network hardware 226 is able to support any type of communications, including voice, data, other communications, or combinations of these.

In the illustrated example, the privacy mode controller 208 does not provide direct control to the hardware components 202. In further examples, the privacy mode controller 208 is able to provide direct control over hardware components 202, such as by turning power off and on to one or more hardware component, using various hardware control interfaces for one or more hardware components, performing other controls, or combinations of these.

Hardware drivers 204 in an example include software drivers that receive inputs from the hardware components 202 and that provide them to one or more apps or higher level drivers 206. The illustrated hardware drivers 204 include the camera driver 240, audio driver 242, location driver 244, and network driver 246. In an example, each of the hardware drivers 204 can include Application Program Interfaces (APIs) that provide one or more software interfaces to the driver. These APIs in an example allow apps or other programs to control resources, exchange data, perform other actions, or any combination of these, for data or other resources that are under the control of that particular hardware driver.

The camera driver 240 receives images captured by the camera 220 and provides them to various apps or higher level drivers 206. In various examples, the camera driver 240 provides APIs that allow any app or higher level drivers 206 to access data, control aspects of camera operations, perform other actions, or combinations of these. In the illustrated example, a video recorder app 264 and a photo capture app 262 are shown to receive data from the camera driver 240. These apps, in an example, allow recording videos or capturing photos, respectively, that consist of images captured by the camera 220.

The camera driver 240 in this example is also able to receive a signal from a video noise source 241. The video noise source 241 in an example generates a video signal that consists of pseudorandom noise energy that is unrelated to images captured by the camera 220. The camera driver 240 has a noise select/enable input 250 that controls whether the camera driver 240 provides video noise or images to apps or higher level drivers 206 through its APIs.

In an example, the privacy mode controller 208 controls the noise select/enable input 250. When the privacy mode controller 208 asserts the noise select/enable input 250 to the camera driver 240, the camera driver 240 provides video noise to apps or higher level drivers. When the noise select/enable input 250 is not asserted, the camera driver 240 provides image data received from the camera 220. Asserting the noise select/enable input 250 is an example of setting the camera function to a disabled state because noise from the video noise source 241 is delivered to apps and higher level drivers 206 instead of images captured by the camera 220. Not asserting the noise select/enable input 250 is an example of setting the camera function to an enabled state because images from the camera 220 are delivered to the apps and higher level drivers 206. The camera driver 240 is an example of a video input function, and a privacy mode definition is able to define a control state that asserts the noise select/enable input 250 so that the video noise source is selected as a noise input to the camera driver 240.

The audio driver 242 receives audio signals captured by the microphone 222 and provides them to various apps or higher level drivers 206. As is similar to the to the camera driver 240, the audio driver 242 includes APIs that support control, data exchange, other operations, or combinations of these. In the illustrated example, an audio recorder app 264 that allows recording audio and an audio transmitter 266 that allows transmitting audio, such as in a telephone call.

The audio driver 242 also is able to receive a signal from an audio noise source 243. The audio noise source 243 in an example generates a pseudorandom noise signal in the audio frequency band that is unrelated to audio signals produced by the microphone 222. As is similar to the camera driver 240, the audio driver 242 includes a noise select enable input 252. In the illustrated example, the noise select enable input 252 is controlled by the privacy mode controller 208. Asserting the noise select enable input 252 in an example causes the audio signal produced by the audio noise source 243 to be provided to apps or higher level drivers 206 instead of audio produced by the microphone 222. When the noise select enable input 252 is not asserted, audio signals produced by the microphone 222 are provided to apps or higher level drivers 206. The audio driver 242 is an example of an audio input function, and a privacy mode definition is able to define a control state that asserts the noise select/enable input 252 so that the audio noise source 243 is selected as a noise input to the audio driver 242.

The location driver 244 receives location information from the location device 224 and provides that information to apps or higher level drivers 206. A location reporting app 268 is shown to receive location produced by the location driver 244. The illustrated location driver 244 has disable input 254 that is controlled by the privacy mode controller 208. In some examples, asserting the disable input 254 of the location driver 244 causes the location driver 244 to produce information that is not related to the location information received from the location device 224. In various examples, asserting the disable input 254 causes the location driver to produce a random location, a fixed location that is unlikely to be an actual location (such as the south pole), other outputs, no output, or combinations of these. When the disable input 254 is not asserted, the location received from the location device 224 is provided to apps or higher level drivers.

A network driver 246 controls communications through the network hardware 226. In an example, the network driver 246 controls communications over a Wi-Fi® or other wireless data network. In supporting operations in wireless data networks, the network driver 246 is able to support scanning for available networks. In scanning for available networks, an identifier of the electronic device is often transmitted for identification. An example of such an identifier is a Media Access Control (MAC) address 248 that is configured into the electronic device. A MAC address 248 is intended to be a unique identifier for the electronic device.

In order to support implementing privacy modes, the network driver 246 is able to transmit a different MAC address as a device identifier for scanning operations. Using a different MAC address for scanning operations restricts a remote communications station from keeping track of when that particular device is scanning in its area. The network driver 246 in an example includes a MAC change input 256 that is controlled by the privacy mode controller 208. Asserting the MAC change input 256 in an example causes the network driver to use a different MAC address for scanning operations. In an example, the network driver 246 will use the MAC address 248 of the electronic device when establishing a communications session with a remote terminal regardless of the state of the MAC change input 256.

In the illustrated examples, the apps or higher level drivers 206 have enable or controlling inputs. The video recorder 260 has an enable input 261, the photo capture 262 has an enable input 253, the audio recorder 264 has an enable input 265, and the audio transmitter 266 has an enable input 267. The privacy mode controller 208 in an example controls these inputs. Asserting any of these inputs causes its associated app to operate normally. If any of these inputs is not asserted, operation of its associated app is generally restricted in some manner In some examples, not asserting the enable input will cause the app to not operate, operate in a manner that improves privacy, operate in a manner different that is normal for that app, or combinations of these.

The Wi-Fi® scanning app 272 operates with the network driver 246 in an example and support scanning for Wi-Fi® stations. The Wi-Fi® scanning app 272 includes a MAC change component 280 that causes the MAC address reported during scanning to be changed, as is described above. In various example, the MAC change component 280 operates in place of, in conjunction with, in addition to, or in other combination with, the MAC change input 256.

A VPN component 274 communicates with the network driver 246 and allows a Virtual Private Network (VPN) communications link to be established with a remote network. In general, an electronic device is able to establish a VPN connection with a remote network such that all data communications by that electronic device is carried out through the VPN connection. Using the VPN connection for all data communications is able to improve the security and privacy of data communications by that electronic device since all communications will also be subject to the communications security of the remote network. The VPN component 274 includes a require input 275 that is controlled by the privacy mode controller 208. When the require input 275 is asserted, the network driver 246 conducts all data communications through a VPN connection to a specified remote network. If the require input 275 is not asserted, data communications is able to be carried based on network selections defined by other techniques.

Web browser 276 allows a user to view information via the World Wide Web (WWW). The web browser 276 in this example supports a "private mode" whereby various operations of the web browser 276 are configured to improve a user's privacy. For example, browsing histories may not be stored when in privacy mode. In general, a web browser 276 does not default to a privacy mode and operations by the user after each time the web browser are used to change the web browser 276 into its privacy mode. The web browser 276 has a privacy mode only enable input 278 to cause, when it is asserted, the web browser 276 to only operate in its privacy mode. The privacy mode only enable input 278 in an example is controlled by the privacy mode controller 208. If the privacy mode only enable input 278 is not asserted, the web browser 276 is able to operate in modes other than the privacy mode. In further examples, asserting the privacy mode only enable input 278 causes the web browser 276 to start up or default into its privacy mode, but allows a user to exit privacy mode in various ways after the web browser 276 is operation.

FIG. 3 illustrates a privacy mode definitions table 300, according to an example. The privacy mode definitions table 300 is described with reference to elements described above in electronic device block diagram 200. The privacy mode definition table 300 depicts a number of privacy mode definitions that are able to be stored in the privacy mode definition storage 210. The data in the privacy mode definitions table 300 is able to be configured by any suitable technique, such as via the above described privacy mode configuration module 212, by other techniques, or by combinations of these.

The privacy mode definitions table 300 includes a controlled function list 302 and a function control state table 304. The controlled function list 302 includes functions that are controlled in various privacy modes. The function control state table 304 includes a column for each privacy mode definition, and in each column the control state of each controlled function is defined.

The controlled function list 302 includes a number of functions that are described above. In the illustrated example, the controlled function list 302 includes camera video 310, camera photo 312, audio recording 314, audio transmit 316, location reporting 318, location random 320, location false 322, MAC tracking 324, VPN required 326, and non-privacy mode web browsing allowed 328. In some examples, a function in the controlled function list is a function that includes operation of one or more of hardware components 202, hardware drivers 204, apps or higher level drivers 206, or combinations of these.

The illustrated function control state table 304 includes six privacy mode definitions. Each privacy mode definition has a column in the function control state table 304. A privacy mode name row 350 identifies each column in the function control state table 304 and thus the particular privacy mode defined in that column.

The columns of the function control state table 304 define control states for each controlled function that are defined by each privacy mode definition. A first privacy mode definition column 330 has an entry of "1" in the privacy mode name row 350 and corresponds to a privacy mode that is specified by the identifier "1." In an example, a user is able to simply specify "1" with an appropriate user interface to cause the privacy mode defined by the first privacy mode definition column 330 to be activated. When the first privacy mode is activated, the control state of each controlled function in the controlled function list 302 is set according to the values indicated in the first privacy mode definition column 330. A second privacy mode definition column 332 has an entry of "2" in the privacy mode name row 350 and a third privacy mode definition column 334 has an entry of "3" in the privacy mode name row 350. In an example, one of these privacy modes is able to be specified as the selected privacy mode by simply specifying "2" or "3," respectively. These three privacy modes are referred to as "user selected" because, in an example, any one of these privacy modes is able to be selected at any time by specifying its number or other identifier via a suitable interface. In an example, a user is able to specify one of these numbers via a suitable user interface or hardware switch position. In some examples, one of these privacy modes is able to also be specified by any suitable technique which may or may not include user input or interaction.

A home privacy mode definition column 336 has an entry of "HOME" in the privacy mode name row 350 and an office privacy mode definition column 338 has an entry of "OFFICE" in the privacy mode name row 350. These two privacy modes are selected based on the location of an electronic device. In an example, the location of the electronic device is determined by the location device 224. In an example, geographic regions that correspond to a person's "home" and "office" are defined and when the electronic device is within one of these regions, the associated privacy mode is activated. In further examples, activation of one of these privacy modes is not based on an automatically determined location and, for example, a user or other entity is able to select one of these privacy modes via an input to the privacy mode controller. The home privacy mode definition column 336 and the office privacy mode definition column 338 are examples of privacy mode definitions that are associated with a geographical location. In an example, a process that receives an indication that the electronic device is within one of those geographical locations is able to use the received geographical location as an input indicating the privacy mode definition associated with that geographic location.

A night privacy mode definition column 340 has an entry of "night" in the privacy mode name row 350. The night privacy mode is activated in an example based on the local time where the electronic device is located. In general, night privacy mode is able to be based on any range of time of day that exists at any specified location. The night privacy mode is referred to as a time selected privacy mode because it is selected based on time. The time is able to be determined by any suitable technique. In various examples, a priority is defined as to whether time selected privacy modes will override location selected privacy modes, or if location selected privacy modes will override time selected privacy modes. Override priorities of the various privacy modes are able to be defined by any suitable technique and according to any suitable criteria. The night privacy mode definition column 340 is an example of privacy mode definitions that is associated with a time of day. In an example, a process that receives an indication of that time of day is able to use the received time of day as an input indicating the privacy mode definition associated with that time of day.

The first privacy mode definition column 330, second privacy mode definition column 332, and third privacy mode definition column 334 define privacy modes with decreasingly stringent protections. The first privacy mode definition column 330 disables all functions. The second privacy mode definition column 332 enables some functions while disabling others. The third privacy mode definition column 334 enables all functions.

Figure 4:
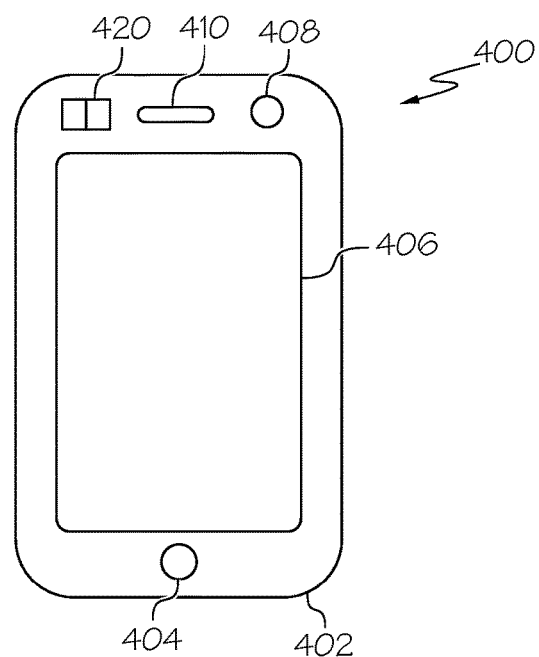
FIG. 4 illustrates a device with privacy mode selection switch, according to an example.

FIG. 4 illustrates a device with privacy mode selection switch 400, according to an example. The device with privacy mode selection switch 400 depicts the front of an electronic device 402 that includes a hardware switch 282, as is described above, to activate or deactivate a defined privacy mode definition for the electronic device.

The electronic device 402 is an example of a smartphone that has a microphone 404 and earpiece speaker 410 to facilitate voice communications. The illustrated electronic device also has a camera 408. In an example, the electronic device 402 allows definition of one or more privacy modes that control functions associated with one or more of these components.

The electronic device 402 also includes a display 406 that allows visual information to be presented to a user of the electronic device 402. In an example, the display 406 supports presenting text, graphics, images, other visual presentations, or combinations of these. The display 406 in an example is able to present graphical user interface elements to allow a user to receive information from the electronic device. In some examples, the display 406 includes a touch sensitive surface that allows a user to interact with a graphical user interface and provide input selections to the electronic device 402.

The electronic device 402 includes a privacy mode switch 420. The privacy mode switch is an example of the above described hardware switch 282. As described above, the privacy mode switch 420 is able to allow a user to activate a selected privacy mode for the device, or to deactivate privacy modes altogether.

Figure 5:
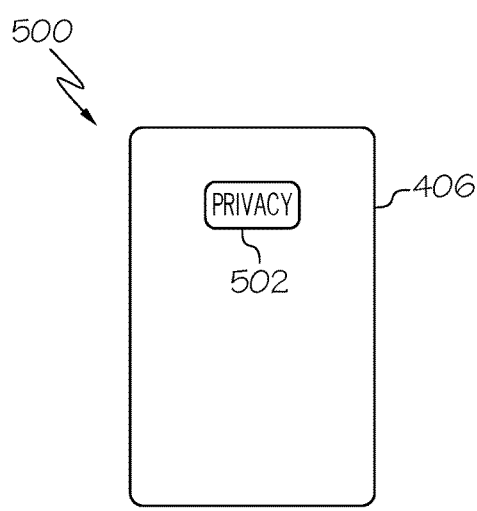
FIG. 5 depicts a single privacy mode selection graphical user interface, according to an example.

FIG. 5 depicts a single privacy mode selection graphical user interface 500, according to an example. Referring to the device with privacy mode selection switch 400, the single privacy mode selection graphical user interface 500 depicts a graphical user interface presented on a display 406 that is touch sensitive. The single privacy mode selection graphical user interface 500 includes a privacy graphical user interface element 502. The privacy graphical user interface element 502 in an example is a single element, such as a graphical user interface "button," that includes the word "PRIVACY." In an example, a user's touching of the privacy graphical user interface element 502 causes a privacy mode definition associated with the privacy graphical user interface element 502 to be switched from activated to deactivated, or from deactivated to activated. In other words, successive touching of the privacy graphical user interface element 502 causes that privacy mode to toggle between "ON' and "OFF." In some examples, an appearance of the privacy graphical user interface element 502 is altered based on whether the selected privacy mode is activated or deactivated. Such alterations may include, for example, changing a color of the privacy graphical user interface element 502, adding additional text to the privacy graphical user interface element 502, other changes, or combinations of these.

In some examples, the privacy graphical user interface element 502 is able to operate in conjunction with the privacy mode switch 420. In further examples, the privacy graphical user interface element 502 is able to replace the privacy mode switch 420 and an electronic device that presents the privacy graphical user interface element 502 will not include a privacy mode switch 420.

Figure 6:
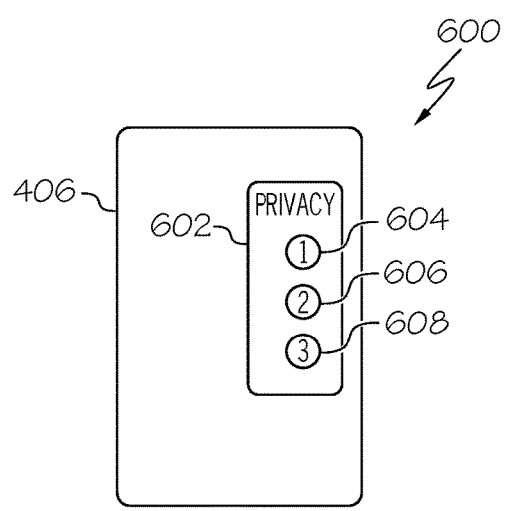
FIG. 6 depicts a multiple privacy mode selection graphical user interface, according to an example.

FIG. 6 depicts a multiple privacy mode selection graphical user interface 600, according to an example. As is similar to the single privacy mode selection graphical user interface 500, the multiple privacy mode selection graphical user interface 600 depicts a graphical user interface presented on a display 406 that is touch sensitive. The multiple privacy mode selection graphical user interface 600 includes privacy button group graphical user interface element 602. The privacy button group graphical user interface element 602 includes the word "PRIVACY" and includes a number of privacy user interface elements that allow selection of a particular privacy mode. The illustrated privacy button group graphical user interface element 602 includes three privacy graphical user interface elements: a first privacy graphical user interface element 604, a second privacy graphical user interface element 606, and a third privacy graphical user interface element 608.

With reference to the privacy mode definitions table 300, selection of the first privacy graphical user interface element 604 in one example, such as by a user's touching the image on the display 406, causes the first privacy mode as defined by the first privacy mode definition column 330 to be activated. Similarly, selection of the second privacy graphical user interface element 606 causes the second privacy mode defined by the second privacy mode definition column 332 to be activated, and selection of the third privacy graphical user interface element 608 causes the third privacy mode defined by the third privacy mode definition column 334 to be activated. In an example, selecting, such as by pressing, a selected privacy graphical user interface element operates to deactivate all privacy modes. In some examples, an appearance of a selected privacy graphical user interface element is altered based on whether the associated privacy mode is activated or deactivated. Such alterations may include, for example, changing a color of the privacy graphical user interface element 502, adding additional text to the privacy graphical user interface element 502, other changes, or combinations of these.

Figure 7:
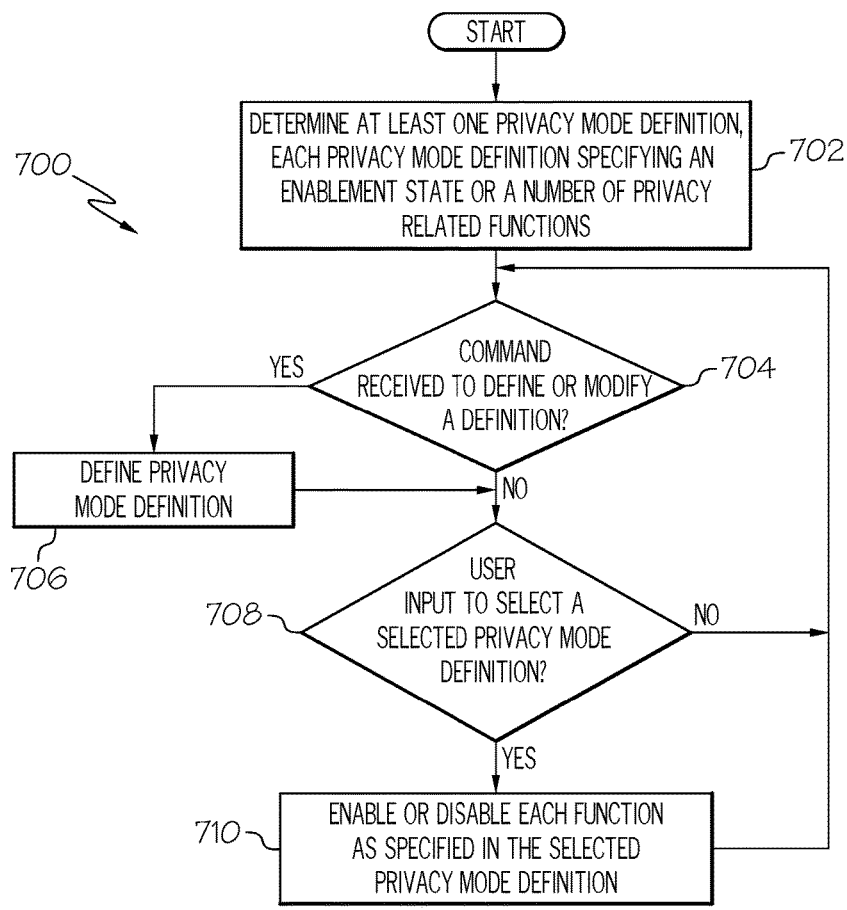
FIG. 7 illustrates a selectable privacy mode implementation process, according to an example.

FIG. 7 illustrates a selectable privacy mode implementation process 700, according to an example. The selectable privacy mode implementation process 700 in an example is performed by various components in the electronic device block diagram 200.

The selectable privacy mode implementation process 700 begins by determining, at 702, at least one privacy mode definition specifying an enablement state for a number of privacy related functions. Examples of determining privacy mode definitions are able to include, for example, reading enablement states for one or more privacy mode definitions from the privacy mode definition storage 210.

A determination is made, at 704, as to whether a command is received to define or modify a privacy mode definition. Such a command is able to be received by, for example, a user interface 216. If such a command is received, at least one privacy mode definition is defined, at 706. In an example, defining at least one privacy mode definition is performed by the above described privacy mode configuration module 212. As described above, these definitions are able to be based on one or more of user provided selections, IT policy definitions, definitions provided by other sources, or combinations of these.

Returning to determining if a command is received to define a privacy mode definition, if no such command is received, or after the privacy mode definition is defined, a determination is made, at 708, as to whether an input to select a selected privacy mode definition is received. Such an input is able to be received via, for example, the user interfaces described above with regards to single privacy mode selection graphical user interface 500, multiple privacy mode selection graphical user interface 600, or privacy mode switch 420.

If an input is received to select a selected privacy mode definition, each function is enabled or disabled, at 710, as is specified in the selected privacy mode definition. If no such input is received, or after enabling or disabling each function as is specified in the selected privacy mode definition, the selectable privacy mode implementation process 700 returns to determining, at 704, if a command is received to define or modify a privacy mode definition and the subsequent processing described above.

Figure 8:
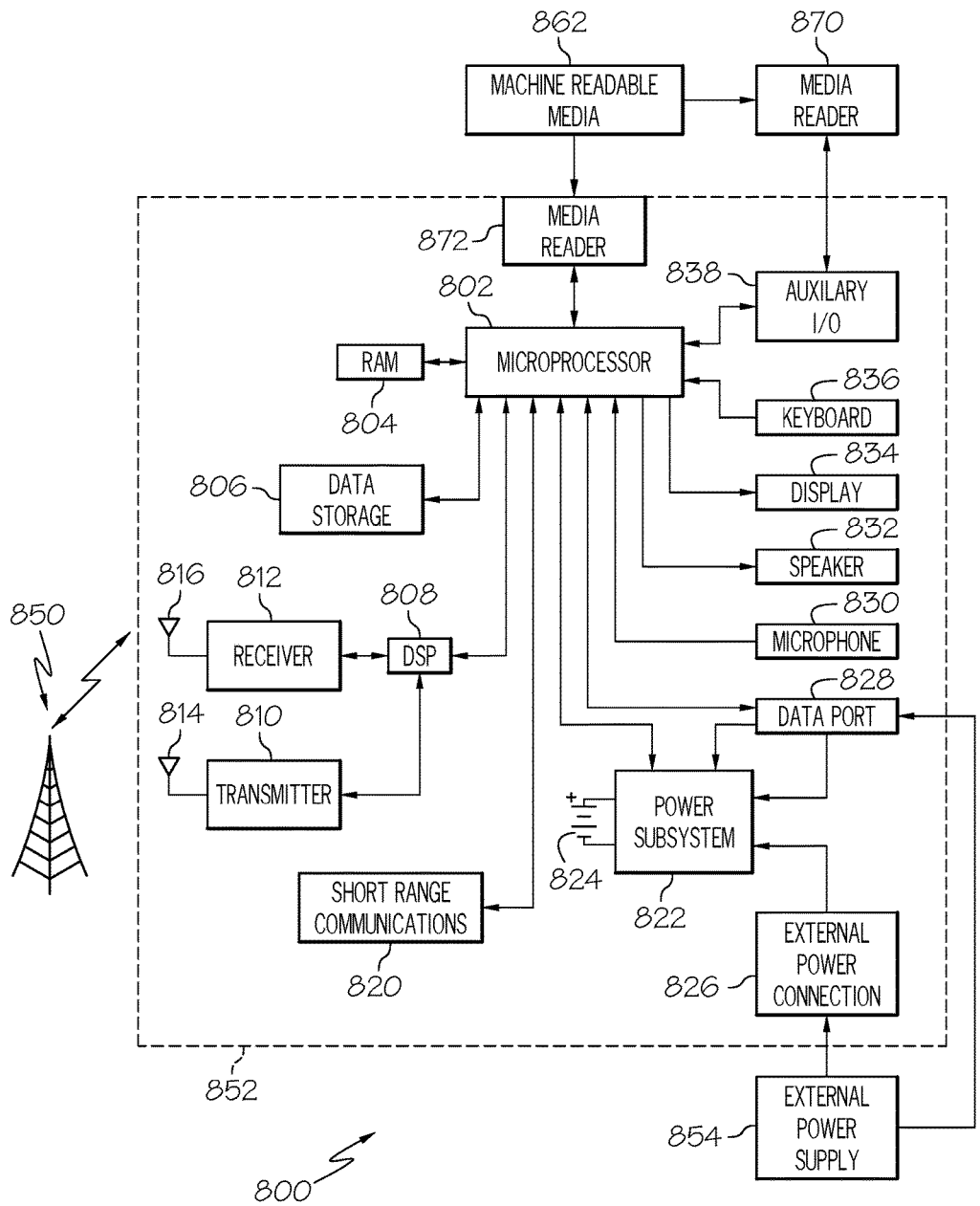
FIG. 8 is a block diagram of an electronic device and associated components in which the systems and methods disclosed herein may be implemented.

FIG. 8 is a block diagram of an electronic device and associated components 800 in which the systems and methods disclosed herein may be implemented. In various examples, the electronic device 852 is able to be an example of the above described electronic devices with selectable privacy modes as is depicted in the above electronic device block diagram 200. In some examples, electronic devices support data communications without supporting voice communications. For example, some electronic devices support data communications via a local data communications network, such as a WiFi® network. In some examples, devices may support voice communications via various techniques, such as Voice over Internet Protocol (VoIP), using systems such as BlackBerry Messenger® Voice, other voice over data systems, or combinations of these. Such electronic devices communicate with a wireless voice, text chat, or data network 850 using a suitable wireless communications protocol. Wireless voice communications are performed using either an analog or digital wireless communication channel. Data communications allow the electronic device 852 to communicate with other computer systems via the Internet.

The illustrated electronic device 852 is an example electronic device that includes two-way wireless communications functions. Such electronic devices incorporate communication system elements such as a wireless transmitter 810, a wireless receiver 812, and associated components such as one or more antenna elements 814 and 816. A digital signal processor (DSP) 808 performs processing to extract data from received wireless signals and to generate signals to be transmitted. The particular design of the communication system is dependent upon the communication network and associated wireless communications protocols with which the device is intended to operate.

The electronic device 852 includes a microprocessor 802 that controls the overall operation of the electronic device 852. The microprocessor 802 interacts with the above described communications system elements and also interacts with other device systems. In various examples, the electronic device 852 is able to include one or more of various components such as a data storage 806, random access memory (RAM) 804, auxiliary input/output (I/O) device 838, data port 828, display 834, keyboard 836, earpiece 832, media reader 870, microphone 830, a short-range communications system 820, a power system 822, other systems, or combinations of these.

One or more power storage or supply elements, such as a battery 824, are connected to a power system 822 to provide power to the circuits of the electronic device 852. The power system 822 includes power distribution circuitry for providing power to the electronic device 852 and also contains battery charging circuitry to manage recharging the battery 824 (or circuitry to replenish power to another power storage element). The power system 822 receives electrical power from external power supply 854. The power system 822 is able to be connected to the external power supply 854 through a dedicated external power connector (not shown) or through power connections within the data port 828. The power system 822 includes a battery monitoring circuit that is operable to provide a status of one or more battery status indicators, such as remaining capacity, temperature, voltage, electrical current consumption, and the like, to various components of the electronic device 852.

The data port 828 is able to support data communications between the electronic device 852 and other devices through various modes of data communications, such as high speed data transfers over optical communications circuits. Data port 828 is able to support communications with, for example, an external computer or other device. In some examples, the data port 828 is able to include electrical power connections to provide externally provided electrical power to the electronic device 852, deliver electrical power from the electronic device 852 to other externally connected devices, or both. Data port 828 of, for example, an electronic accessory is able to provide power to an electronic circuit, such as microprocessor 802, and support exchanging data between the microprocessor 802 and a remote electronic device that is connected through the data port 828.

Data communication through data port 828 enables a user to set preferences through the external device or through a software application and extends the capabilities of the device by enabling information or software exchange through direct connections between the electronic device 852 and external data sources rather than via a wireless data communication network. In addition to data communication, the data port 828 provides power to the power system 822 to charge the battery 824 or to supply power to the electronic circuits, such as microprocessor 802, of the electronic device 852.

Operating system software used by the microprocessor 802 is stored in data storage 806. Examples of data storage 806 are able to include, for example, flash memory, magnetic based storage devices, other volatile or non-volatile data store elements, or the like. Some examples are able to use data storage 806 that includes a battery backed-up RAM or other non-volatile storage data elements to store operating systems, other executable programs, or both. The operating system software, device application software, or parts thereof, are able to be temporarily loaded into volatile data storage such as RAM 804. Data received via wireless communication signals or through wired communications are also able to be stored to RAM 804.

The microprocessor 802 further executes software applications on the electronic device 852. In an example, programs and other data used to support the processes described above are able to be installed in the memory of the electronic device 852. Further examples of applications that are able to be loaded onto the device may be a personal information manager (PIM) application having the ability to organize and manage data items relating to the device user, such as, but not limited to, e-mail, calendar events, voice mails, appointments, and task items. The applications are able to include the above described base applications, which may be installed during manufacture or from another trusted and verified source, along with user applications that may be installed at any time.

Further applications may also be loaded onto the electronic device 852 through, for example, the wireless network 850, an auxiliary I/O device 838, data port 828, short-range communications system 820, or any combination of these interfaces. Such applications are then able to be installed by a user in the RAM 804 or a non-volatile store for execution by the microprocessor 802.

In a data communication mode, a received signal such as a text message or web page download is processed by the communication system, including wireless receiver 812 and wireless transmitter 810, and communicated data is provided the microprocessor 802, which is able to further process the received data. In some examples, the electronic device 852 includes a display, output ports, or combinations of these. In such examples, the received data is able to be processed for output to the display 834, or alternatively, to an auxiliary I/O device 838 or the data port 828. In examples of the electronic device 852 that include a keyboard 836 or other similar input facilities, a user of the electronic device 852 may also compose data items, such as e-mail messages, using the keyboard 836, which is able to include a complete alphanumeric keyboard or a telephone-type keypad, in conjunction with the display 834 and possibly an auxiliary I/O device 838. Such composed items are then able to be transmitted over a communication network through the communication system.

For voice communications, overall operation of the electronic device 852 is substantially similar, except that received signals are generally provided to an earpiece 832 and signals for transmission are generally produced by a microphone 830. Alternative voice or audio I/O systems, such as a voice message recording system, may also be implemented on the electronic device 852. Although voice or audio signal output is generally accomplished primarily through the earpiece 832, in examples of electronic devices 852 that include a display 834, the display 834 may also be used to provide an indication of the identity of a calling party, the duration of a voice call, or other voice call related information, for example.

Depending on conditions or statuses of the electronic device 852, one or more particular functions associated with a system circuit may be disabled, or an entire system circuit may be disabled. For example, if the battery temperature is low, then voice functions may be disabled, but data communications, such as e-mail, may still be enabled over the communication system.

A short-range communications system 820 provides for data communication between the electronic device 852 and different systems or devices, which need not necessarily be similar devices. For example, the short-range communications system 820 includes an infrared device and associated circuits and components or a radio frequency based communication module such as one supporting Bluetooth® communications, to provide for communication with similarly-enabled systems and devices, including the data file transfer communications described above. The short-range communications system is also able to include one or more of components to support communications over wireless links such as Wi-Fi®, Near Field Communications (NFC), any other short range link, or combinations of these A media reader 870 is able to be connected to an auxiliary I/O device 838 to allow, for example, loading computer readable program code of a computer program product into the electronic device 852 for storage into flash memory 806. One example of a media reader 860 is an optical drive such as a CD/DVD drive, which may be used to store data to and read data from a computer readable medium or storage product such as computer readable storage media 862. Examples of suitable computer readable storage media include optical storage media such as a CD or DVD, magnetic media, or any other suitable data storage device. Media reader 860 is alternatively able to be connected to the electronic device through the data port 828 or computer readable program code is alternatively able to be provided to the electronic device 852 through the wireless network 850. In an example, an internal media reader 872 is also able to be included in the electronic device 852 that is also able to read machine readable media 862.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises some or all the features enabling the implementation of some or all of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method of controlling a device, the method comprising:
storing a plurality of privacy mode definitions, each privacy mode definition comprising a respective control state definition for each function in a plurality of functions of an electronic device, the plurality of functions comprising at least two of communications functions, sensor functions, application functions, or combinations of these;
receiving an input indicating a selected privacy mode definition from within the plurality of privacy mode definitions; and
setting a respective control state of each function in the plurality of functions based on each respective control state definition in the selected privacy mode definition,
where the plurality of privacy mode definitions comprises a privacy mode definition associated with at least one of a geographical location and a time of day,
where receiving the input comprises receiving at least one of the geographic location or the time of day, and
wherein the method further comprises prioritizing the plurality of privacy mode definitions, a first priority being defined as to whether time selected privacy modes will override location selected privacy modes within the selected privacy mode definition indicated by the input or whether location selected privacy modes will override time selected privacy modes within the selected privacy mode definition indicated by the input.

2. The method of claim 1, where receiving the input comprises receiving an input from a hardware switch mounted on the device.

3. The method of claim 1, where receiving the input comprises receiving a selection of a single graphical user interface icon.

4. The method of claim 1, wherein the plurality of functions comprises an audio input function, and the respective control state definition in the selected privacy mode definition for the audio input function comprises selecting a noise input to the audio input function.

5. The method of claim 1, wherein the plurality of functions comprises an video input function, and the respective control state definition in the selected privacy mode definition for the video input function comprises selecting a noise input to the video input function.

6. The method of claim 1, wherein the plurality of functions comprises a network communications function, and the respective control state definition in the selected privacy mode definition for the network communications function comprises using a different device identifier that is transmitted by the network communications function for network scanning operations.

7. A device with selectable privacy modes, the device comprising:
a privacy mode definition storage configured to store a plurality of privacy mode definitions, each privacy mode definition comprising a respective control state definition for each function in a plurality of functions of an electronic device, the plurality of functions comprising at least two of communications functions, sensor functions, application functions, or combinations of these;

an input configured to receive an input indicating a selected privacy mode definition from within the plurality of privacy mode definitions; and a privacy mode controller configured to set a respective control state of each function in the plurality of functions based on each respective control state definition in the selected privacy mode definition, where the plurality of privacy mode definitions comprises a privacy mode definition associated with at least one of a geographical location and a time of day, where receiving the input comprises receiving at least one of the geographic location or the time of day, and wherein the privacy mode controller is further configured to prioritize the plurality of privacy mode definitions, a first priority being defined as to whether time selected privacy modes will override location selected privacy modes within the selected privacy mode definition indicated by the input or whether location selected privacy modes will override time selected privacy modes within the selected privacy mode definition indicated by the input.

8. The device of claim 7, the input comprising a hardware switch configured to indicate an input.

9. The device of claim 7, the input comprising single graphical user interface configured to receive a selection of a single graphical user interface icon.

10. The device of claim 7, wherein the plurality of functions comprises an audio input function, and the respective control state definition in the selected privacy mode definition for the audio input function comprises selecting a noise input to the audio input function.

11. The device of claim 7, wherein the plurality of functions comprises a video input function, and the respective control state definition in the selected privacy mode definition for the video input function comprises selecting a noise input to the video input function.

12. The device of claim 7, wherein the plurality of functions comprises a network communications function, and the respective control state definition in the selected privacy mode definition for the network communications function comprises using a different device identifier that is transmitted by the network communications function for network scanning operations for scanning operations.

13. A non-transitory computer readable storage medium having computer readable program code embodied therewith, the computer readable program code comprising instructions for:

storing a plurality of privacy mode definitions, each privacy mode definition comprising a respective control state definition for each function in a plurality of functions of an electronic device, the plurality of functions comprising at least two of communications functions, sensor functions, application functions, or combinations of these;

receiving an input indicating a selected privacy mode definition from within the plurality of privacy mode definitions; and setting a respective control state of each function in the plurality of functions based on each respective control state definition in the selected privacy mode definition, where the plurality of privacy mode definitions comprises a privacy mode definition associated with at least one of a geographical location and a time of day, where receiving the input comprises receiving at least one of the geographic location or the time of day, and where the computer readable program code further comprises instructions for prioritizing the plurality of privacy mode definitions, a first priority being defined as to whether time selected privacy modes will override location selected privacy modes within the selected privacy mode definition indicated by the input or whether location selected privacy modes will override time selected privacy modes within the selected privacy mode definition indicated by the input.

14. The non-transitory computer readable storage medium of claim 13, where the instructions for receiving the input comprise instructions for receiving an input from a hardware switch.

15. The non-transitory computer readable storage medium of claim 13, where the instructions for receiving the input comprise instructions for receiving a selection of a single graphical user interface icon.

16. The non-transitory computer readable storage medium of claim 13, wherein the plurality of functions comprises an audio input function, and the respective control state definition in the selected privacy mode definition for the audio input function comprises selecting a noise input to the audio input function.

17. The non-transitory computer readable storage medium of claim 13, wherein the plurality of functions comprises a video input function, and the respective control state definition in the selected privacy mode definition for the video input function comprises selecting a noise input to the video input function.

18. The method of claim 6, wherein using a different device identifier that is transmitted by the network communications function for network scanning operations comprises transmitting a different Media Access Control Address.

19. The method of claim 1, further comprising:

receiving a second input from a user interface of the device; and setting, based on receiving the second input, a second respective control state where setting the respective control state comprises configuring a noise source as an input of at least one sensor input function of the device.

* * * * *